United States Patent [19]

Kimura et al.

[11] Patent Number: 4,629,167
[45] Date of Patent: Dec. 16, 1986

[54] PISTON CYLINDER TYPE DAMPER

[75] Inventors: Shigeru Kimura, Kamakura; Akira Mizusawa, Utsunomiya, both of Japan

[73] Assignee: Nifco, Inc., Yokohama, Japan

[21] Appl. No.: 629,761

[22] Filed: Jul. 11, 1984

[30] Foreign Application Priority Data

Jul. 14, 1983 [JP] Japan .................. 58-108225[U]

[51] Int. Cl.$^4$ .............................. F16F 1/06
[52] U.S. Cl. ................... 267/8 R; 16/66; 16/84; 92/26; 92/170; 92/248; 137/846; 188/67; 188/282; 188/300; 188/322.15; 188/322.22; 267/64.12; 267/120; 267/127
[58] Field of Search ............. 188/322.15, 322.22, 188/282, 300, 67; 16/66, 84; 267/127, 120, 8.2, 64.12, 124; 137/846; 92/14, 23, 26, 170, 248; 403/109

[56] References Cited

U.S. PATENT DOCUMENTS

| | | | |
|---|---|---|---|
| 1,013,762 | 1/1912 | Gibbs | 16/84 |
| 1,055,030 | 3/1913 | Gibbs | 16/66 |
| 2,838,300 | 6/1958 | Gray | 92/170 X |
| 2,912,069 | 11/1959 | Dillenburger | 188/322.15 |
| 3,484,090 | 12/1969 | Mahoney | 267/127 X |
| 3,711,892 | 1/1973 | Tabor | 188/67 X |
| 3,789,742 | 2/1974 | Hershman et al. | 92/26 |
| 3,799,036 | 3/1974 | Slaughter | 188/300 |
| 4,078,779 | 3/1978 | Molders | 188/300 X |
| 4,211,427 | 7/1980 | Young et al. | 403/109 X |
| 4,240,630 | 12/1980 | Hoffman | 137/846 X |
| 4,309,027 | 1/1982 | Molders et al. | 267/64.12 X |

FOREIGN PATENT DOCUMENTS

| | | | |
|---|---|---|---|
| 1584107 | 8/1969 | Fed. Rep. of Germany | 16/66 |
| 1149727 | 7/1957 | France | 137/846 |
| 1166482 | 6/1958 | France | 188/322.15 |
| 48112 | 12/1981 | Japan | 188/300 |
| 57-43773 | 9/1982 | Japan | |

OTHER PUBLICATIONS

Vernay Laboratories Inc., 5MYK379, 5-1979, "Duckbills".

Primary Examiner—George E. A. Halvosa
Attorney, Agent, or Firm—Schwartz & Weinrieb

[57] ABSTRACT

The piston cylinder type damper comprises a cylinder connected to either member of the pair of a main body and an openable object, and a piston connected to the other member of the pair and adapted to fit into the cylinder and the piston incorporates therein a check valve adapted to allow the air in the cylinder to escape from the cylinder interior while the piston is driven into the cylinder by the movement of the openable object.

20 Claims, 8 Drawing Figures

4,629,167

PISTON CYLINDER TYPE DAMPER

BACKGROUND OF THE INVENTION

1. Field of the Invention

This invention relates to a piston type damper, and more particularly to a piston cylinder type damper which is set between a main body and an openable object such as a door, ashtray, or chest openably fitted into the main body and enables the openable object to be gently opened from the closed state by virtue of the resilient force of a spring and to be gently closed from the open state, by preventing the openable object from abruptly opening or closing.

2. Description of Prior Art

If an openable object abruptly opens or closes relative to its main body, the impact between them may not only break or deform both of them but also produce vibration and noise and cause the contents of the openable object such as cigarette butts and ashes to be scattered. To avoid this trouble, a damper for absorbing the impact is used between the main body and the openable object. From the prior art there is known a piston cylinder type damper disclosed in Japanese Patent Publication No. SHO 57(1982)-43773.

The damper of this publication is so constructed that the damping action is generated while the piston is driven into its cylindrical housing and virtually none of this action is produced while the piston is drawn out of the cylindrical housing.

OBJECT OF THE INVENTION

An object of this invention is to provide a piston cylinder type damper which produces a damping action only slightly while the piston is driven into the cylindrical housing and produces the action fully while the piston is drawn out.

SUMMARY OF THE INVENTION

To accomplish the object described above, the piston cylinder type damper of this invention comprises a cylinder connected to either member of the pair, namely a main body and an openable object, and a piston connected to the other member of the pair and adapted to fit into the cylinder and the piston incorporates therein a check valve adapted to allow the air in the cylinder to escape from the cylinder interior while the piston is driven into the cylinder by the movement of the openable object.

When the piston is driven into the cylinder, therefore, the air inside the cylinder is allowed to escape to the ambient air and the action of damper is hardly manifested. When the piston is drawn out of the cylinder, the action of damper is fully generated owing to the ensuing decrease of pressure within the cylinder.

BRIEF DESCRIPTION OF THE DRAWING

The other objects and characteristics of the present invention will become apparent from the further disclosure of this invention to be made in the following detailed description of a preferred embodiment, with reference to the accompanying drawings, in which.

DESCRIPTION OF PREFERRED EMBODIMENT

Figure 1:
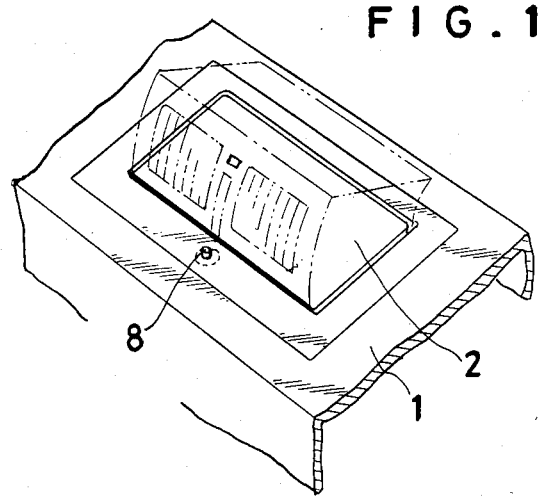
FIG. 1 is a perspective view illustrating a ventilator frame for ventilation adapted pivotally to rise from and fall into a dashboard of an automobile as a typical combination of a main body and an openable object to which the damper of this invention is to be attached.
Figure 2:
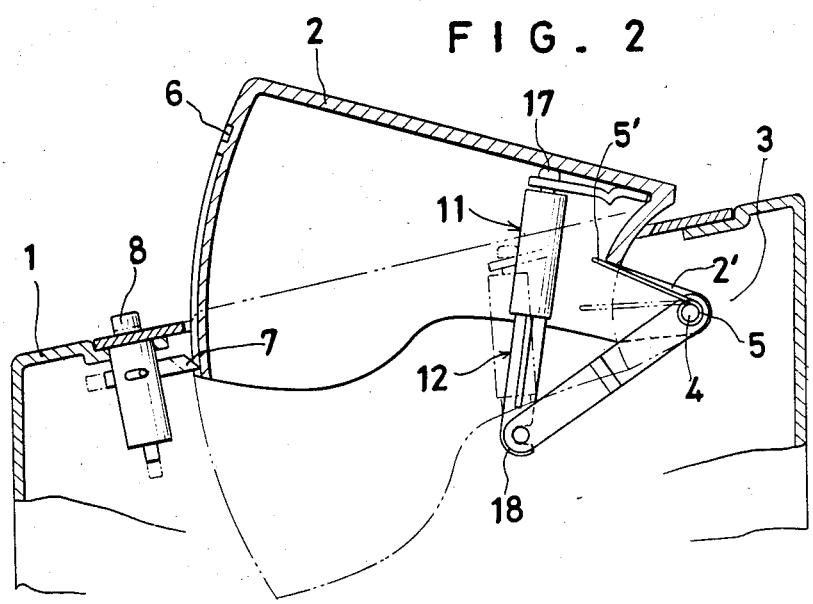
FIG. 2 is a longitudinally sectioned side view illustrating the condition in which the damper of this invention is fixed in the ventilator frame of FIG. 1.
Figure 3:
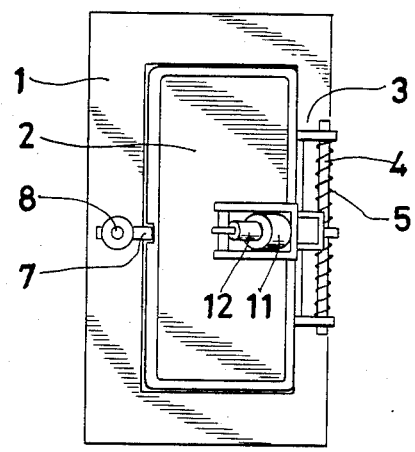
FIG. 3 is a bottom view of the ventilator frame of FIG. 1.

FIGS. 1-3 illustrate one embodiment of this invention in a ventilator frame for ventilation pivotally attached to an opening formed on the upper side of a dashboard in an automobile, so that the ventilator frame will be enabled to rise from and fall into the opening by the action of the damper of this invention. In this arrangement, a dashboard 1 forms a main body and a ventilator frame 2 an openable object and the ventilator frame 2 assumes its opened state when it rises above the dashboard 1 (indicated by a broken line in FIG. 1) and its closed state when its upper surface remains substantially flush with the upper side of the dashboard (indicated by a solid line in FIG. 1).

The ventilator frame 2 is provided on the rear side thereof with a backwardly extended arm 2' the rear end of which is pivotally attached to a shaft 4 supported by a bearing member 3 below the lower side of the dashboard 1.

Around the shaft 4 is coiled a spring 5 one end of which is kept in place by the lower side of the dashboard 1 or by the bearing member 3. The other end 5' of the spring 5 is held pressed against the lower end of the rear side of the ventilator frame 2 to energize the ventilator frame in its opening direction. The ventilator frame is provided on the front side thereof with a recess 6. In the front edge portion of the opening, there is disposed a locking device 7 adapted to thrust into the aforementioned recess 6 and keep the ventilator frame in its closed state after the ventilator frame has been closed. By depressing a push button 8 in the front edge portion of the opening, the locking device 7 is enabled to draw in toward the front against the traction of a built-in spring (not shown) and consequently separate from the recess 6 in the front side of the ventilator frame.

In this case, when the push button 8 is depressed, therefore, the spring 5 which has remained in a closed state is abruptly opened by the energizing force of the ventilator frame 2 and, as the arm 2' collides upwardly against the rear edge portion of the opening with a bang, brought to a stop in its opened state.

The damper of this invention is installed between the main body and the openable object in this arrangement to make the openable object open gently and slowly and appear as though it were a high-grade contrivance and, at the same time, prevent the rear edge portion of the opening from being broken by the otherwise possible powerful collision of the arm 2' during the abrupt opening of the openable object.

Figure 4:
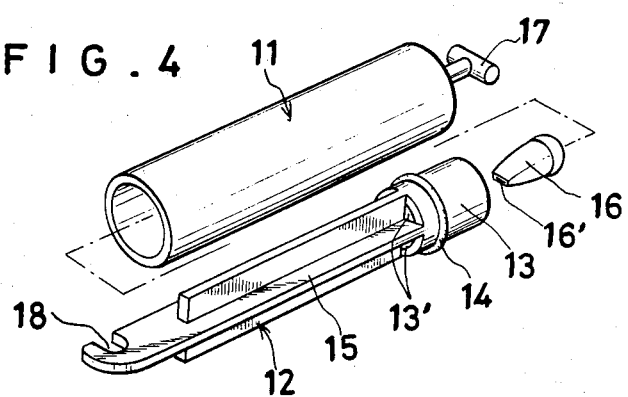
FIG. 4 is a perspective view of one embodiment of a damper of this invention in a disassembled state.
Figure 5:
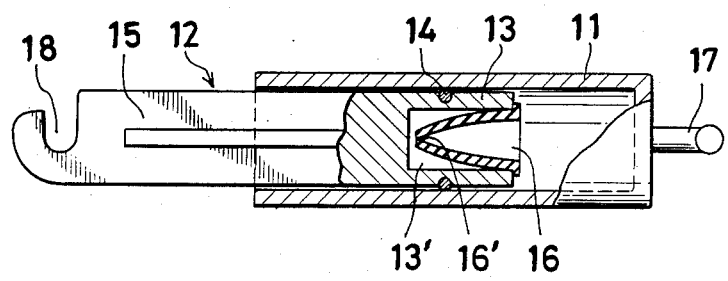
FIG. 5 is a partially sectioned side view of the damper of FIG. 4 in an assembled state.

FIGS. 4 and 5 illustrate one embodiment of damper of this invention, comprising a cylinder 11 and a piston 12 which are both molded of a plastic material. A leading end 13 of the piston 12 which is inserted into the cylinder 11 forms the shape of a hollow tube. An O-ring 14 adapted to come into sliding engagement with the inner wall surface of the cylinder 11 is set in an annular groove formed in the outer surface of the leading end 13 of the piston. The remaining portion of the piston 12 is a crossed shaft 15 having a cruciform cross section. The hollow portion 13' of the leading end 13 opens the front end face of the cross shaft 15, namely the corners of the cruciform walls, and has a check valve 16 of the shape of a beak inserted fast therein.

This check valve 16 is molded of a flexible material such as synthetic rubber. The check valve 16 is provided at one end thereof with an opened air port and at the other end thereof with a normally closed beak 16'. It is fixed inside the hollow portion 13' with the normally closed beak 16' directed to the cross shaft 15.

As the piston 12 is pushed into the cylinder 11, the air within the cylinder 11 enters the valve 16 interior via the open air port of the check valve 16, pushes open the normally closed beak 16' from within, departs from the hollow portion 13', and flows along the cross shaft 15. As the piston driven home inside the cylinder is drawn out, no air is admitted into the cylinder because the normally closed beak 16' is kept closed. Consequently, the piston's movement inside the cylinder 11 is braked by the negative pressure produced inside the cylinder.

This damper is installed between the aforementioned dashboard 1 and the ventilator frame 2 by means of a projection 17 at the end of the cylinder 11 and a hook 18 at the end of the piston 12. When the ventilator frame in its opened state is closed by being pressed down from above with the hand, it can be lightly closed because the piston 12 is pushed into the cylinder 11. When the push button 8 is depressed and the ventilator frame 2 is opened consequently by the energizing force of the spring 5, the negative pressure generated within the cylinder because of the traction of the piston causes the ventilator frame 2 to open slowly and gently.

Figure 6:
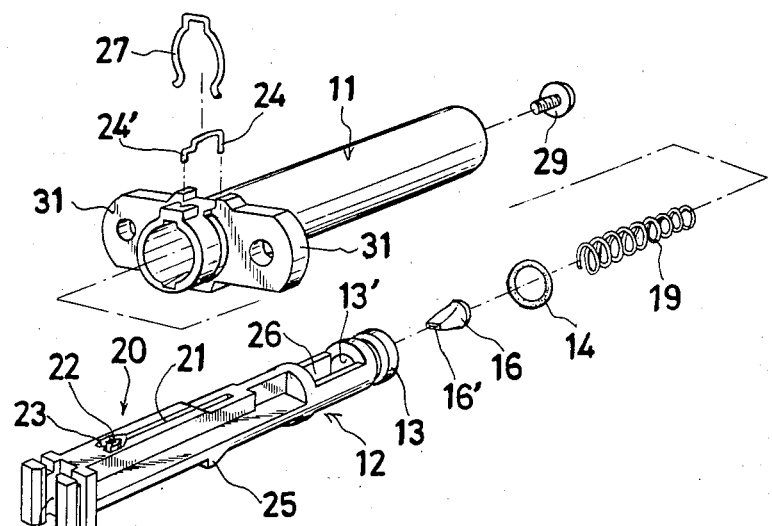
FIG. 6 is a perspective view illustrating another embodiment of a damper of this invention.
Figure 7:
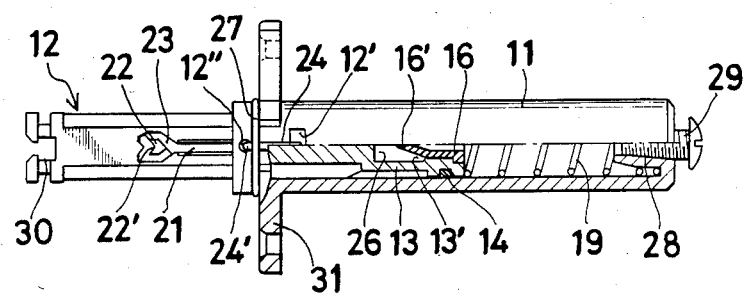
FIG. 7 is a partially sectioned plan view of the damper of FIG. 6.
Figure 8:
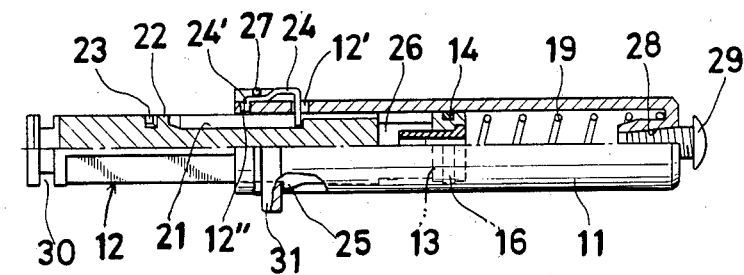
FIG. 8 is a partially sectioned side view of the damper of FIG. 6.

In another embodiment of the damper illustrated in FIGS. 6 to 8, a coil spring 19 adapted to be compressed by the piston 12 which is driven in while the openable object is being closed and consequently allowed to accumulate force for subsequently opening the openable object is contained within the cylinder 11 and a locking device 20 adapted to overcome the resiliency of the aforementioned spring 19 and take hold of the piston 12 driven into the cylinder 11 while the openable object is being closed is interposed between the piston and the cylinder. When the openable object is to be pushed down and closed, it is depressed slightly past its closed position and then is released from the hand. Consequently, this openable object is slightly pushed back in its opening direction in conjunction with the piston by the resiliency of the spring and then stopped at its closed position by the locking device 20. To open the openable object from its closed state, it is again pushed down slightly and then released from the hand. Consequently, the piston 12 is slightly pushed down and the locking device 20 is caused to release the piston and the openable object is pushed out to its opened state in conjunction with the piston by the resiliency of the spring 19.

Although a locking device may be designed to operate with a rotary ratchet, the locking device 20 in this embodiment is adapted to make use of a heart cam known to the art.

In the rear half portion of the piston 12 which completely emerges from within the cylinder 11, a groove 21 is formed in the longitudinal direction. The rear end of this groove 21 communicates with a one-way passage groove 23 formed around a heart-shaped portion 22. At the open end of the cylinder 11, there is disposed a pin 24 having the leading end thereof thrust into the aforementioned groove 21. When the piston 12 is pushed in against the spring 19 to close the openable object, the pin 24 moves relatively along the groove 21 toward the rear end thereof. Then, after the pin 24 has moved substantially half the entire circle of the one-way passage groove 23 around the heart-shaped portion 22, the openable object advances slightly past its closed position. When the force exerted to push the openable object is removed, the resilient force of the spring 19 pushes the openable object and the piston slightly backwardly and the pin 24 is stopped as it is caught on a recess 22' on the heart-shaped portion 22 to keep the openable object in its closed state.

Then, when the openable object is slightly pushed to be opened and released from the hand, the pin 24 departs from the recess 22' of the heart-shaped portion 22, by the resiliency of the spring 19, is caused to move along the remaining substantially one half of the one-way groove 23 and then along the groove 21 to open the openable object. When necessary for regulating the stroke of the piston, there may be provided between the piston and the cylinder a combination guide and stopper 25 which comprises an oblong groove or oblong hole and a projection thrust therein.

The leading end portion 13 of the piston is a hollow tube having an O-ring 14 fitted in place around the outer surface thereof. In the hollow portion 13' of the leading end portion 13, the check valve 16 of the shape of a beak is similarly fixed therein. In this embodiment, the portion of the lying behind the leading end portion 13 is not of a cruciform section. To permit escape of the air emanating through the normally closed beak 16' of the check valve 16, a through hole 26 communicating with the rear end of the hollow portion 13' is bored across the piston 12.

Similarly in this embodiment, therefore, by pushing the piston down against the resiliency of the spring 19, the air inside the cylinder 11 is enabled to flow along the piston through the check valve 16 the through hole 26 and eventually open the openable object. Then, to open the openable object from its closed state, the piston is pushed down slightly and the spring 19 is consequently allowed to manifest its resiliency. As a result, the piston which is in the process of being drawn out of the cylinder gives rise to negative pressure within the cylinder and, owing to this negative pressure, the resiliency of the spring 19 now exerted upon the openable object in the opening direction thereof is damped enough for the openable object to be opened gently.

The pin 24 which is made of a resilient metallic wire such as piano wire is loosely passed through a hole 12' in the rear end portion of the cylinder 12 and thrust in the grooves 21, 23. This pin 24 has its upper end bent substantially in the shape of the inverted letter L and its rear end 24' similarly bent down, though for a considerably shorter distance. The rear end 24' is thrust into a hole 12" in the rear portion of the cylinder 12. A resilient ring 27 substantially in the shape of Ω which is fitted around the outer surface in the rear end portion of the cylinder keeps the middle part of the portion of the pin 24 shaped like the inverted L pressed down fast on the outer surface of the cylinder 12.

Further in the present embodiment, a tapered threaded hole 28 is provided in the end wall of the cylinder 11 and a tapered screw 29 is helically fitted in the tapered threaded hole 28. When the screw 29 is completely tightened, no gap occurs between the screw 29 and the threaded hole 28. When it is slightly loosened, there occurs a gap through which part of the air in the cylinder is released into the ambient air while the piston is being driven into the cylinder. Conversely when the piston is forced out of the cylinder by the resilient force of the spring 19, the ambient air is drawn into the cylinder through this gap. In this arrangement, therefore, the speed with which the openable object is opened by the resiliency of the spring 19 can be adjusted to the optimum level by selecting the degree of the helical insertion of the tapered screw 29 into the threaded hole 28. In this embodiment, 30 stands for a connecting member for connecting the end of the piston 12 to one of the main body and the openable object, and 31 for a flange for connecting the cylinder 11 to the other.

In accordance with this invention, the motion of the openable object which proceeds with progressive withdrawal of the piston from the cylinder can be braked to desired slowness by having the check valve incorporated in the piston and keeping the piston connected to the main body or the openable object and the cylinder to the openable object or the main body.

Obviously, many modifications and variations of the present invention are possible in light of the above teachings. It is therefore to be understood that within the scope of the appended claims, the present invention may be practiced otherwise than as specifically described herein.

What is claimed is:

1. A piston-cylinder type damper, comprising:
   a cylinder connected to one of a main body and an openable object and having a bottom end wall and an open top end;
   a piston, connected to the other one of said main body and said openable object, disposed within said cylinder through said open top end and provided at the end thereof which is disposed interiorly of said cylinder with a cylindrical hollow cavity portion;
   coil spring means disposed within said cylinder between said interior end of said piston and said bottom end wall of said cylinder for resisting the inward movement of said piston into said cylinder when said openable object is moved from an open position to a closed position and for biasing said piston outwardly from said cylinder so as to cause said openable object to move from said closed position to said open position;
   check valve type damping means disposed within said cylindrical hollow cavity portion of said piston for controlling the inward and outward movement of said piston relative to said cylinder, and therefore the closing and opening movement of said openable object; and
   releasable locking means mounted upon said piston and cylinder for retaining said piston at said inward position relative to said cylinder against the biasing force of said biasing means, and thereby retaining said openable object at said closed position, when said releasable locking means is engaged, and for permitting said piston to move outwardly relative to said cylinder under the influence of said biasing means, and thereby permit said openable object to attain its open position, when said releasable locking means is disengaged, comprising a heart-shaped land area provided upon the outer surface portion of said piston, endless groove means defined within said outer surface portion of said piston and disposed about said heart-shaped land area of said piston, and a locking pin fixedly mounted upon said cylinder for disposition within said endless groove means of said piston and for cooperation with said heart-shaped land area so as to respectively permit relative movement of said piston with respect to said cylinder between said open and closed positions, and to retain said piston at said inward position and said openable object at said closed position.

2. A damper according to claim 1, wherein said piston comprises a leading end formed into a hollow tube and a cross shaft, and said check valve is fixed within said hollow tube.

3. A damper according to claim 2, wherein said check valve is made of synthetic rubber, provided at its one end with an opened air port and at its other end with a normally closed beak, and fixed within said hollow tube with said beak directed toward said cross shaft of said piston.

4. A damper as set forth in claim 2, wherein:
   said cross shaft portion of said piston has a cruciform configuration as viewed in cross-section.

5. A damper according to claim 1, wherein said cylinder has a tapered threaded hole at the end wall thereof and a tapered screw is helically fitted in said tapered hole to adjust the degree of controlling movement of said damping means.

6. A damper as set forth in claim 1, wherein:
   said piston and cylinder are both fabricated from a plastic material.

7. A damper as set forth in claim 1, wherein:
   said locking pin has the configuration of an inverted-U with a longer leg thereof extending radially inwardly into said endless groove means.

8. A piston-cylinder type damper, comprising:
   a cylinder connected to one of a main body and an openable object and having a bottom end wall and an open top end;
   a piston, connected to the other one of said main body and said openable object, disposed within said cylinder through said open top end and provided at the end thereof which is disposed interiorly of said cylinder with a cylindrical hollow cavity portion;
   coil spring means disposed within said cylinder between said interior end of said piston and said bottom end wall of said cylinder for resisting the inward movement of said piston into said cylinder when said openable object is moved from an open position to a closed position and for biasing said piston outwardly from said cylinder so as to cause said openable object to move from said closed position to said open position;
   check valve type damping means disposed within said cylindrical hollow cavity portion of said piston for controlling the inward and outward movement of said piston relative to said cylinder, and therefore the closing and opening movement of said openable object;
   female means defined upon the outer surface of said piston comprising a heart-shaped recessed land area and endless groove means leading up to and away from said heart-shaped recessed land area; and male locking pin means fixedly mounted upon said cylinder for disposition within said endless groove means and for engaging said heart-shaped recessed land area of said piston against the biasing force of said coil spring biasing means so as to retain said piston, and said openable object, in an inward closed position against said biasing force of said coil spring biasing means, and for disengaging said heart-shaped recessed land area of said piston so as to permit said piston, and said openable object, to move to an outward open position under the influence of said biasing force of said coil spring biasing means.

9. A piston-cylinder type damper, as set forth in claim 8, wherein:
said check valve damping means comprises a duckbill type check valve with its beak directed toward said open and outward position of said openable object and said piston.

10. A piston-cylinder type damper as set forth in claim 8, wherein:
said check valve is fabricated from synthetic rubber.

11. A piston-cylinder type damper as set forth in claim 8, wherein:
said piston and cylinder are fabricated from a plastic material.

12. A piston-cylinder type damper as set forth in claim 8, further comprising:
a threaded bore defined within said end wall of said cylinder; and
an adjustment screw threadedly received within said threaded bore for controlling the admission of ambient air into said cylinder whereby the damping degree of said damping means is adjustable.

13. A damper as set forth in claim 8, wherein:
said piston has a shaft portion fabricated in the configuration of a cruciform.

14. A damper as set forth in claim 8, wherein:
said locking pin has the configuration of an inverted-U with a longer leg thereof extending radially inwardly into said endless groove means.

15. A piston-cylinder type damper, comprising:
a cylinder connected to one of a main body and an openable object and having a bottom end wall and an open top end;
a piston, connected to the other one of said main body and said openable object, disposed within said cylinder through said open top end and provided at the end thereof which is disposed interiorly of said cylinder with a cylindrical hollow cavity portion;
coil spring means disposed within said cylinder between said interior end of said piston and said bottom end wall of said cylinder for resisting the inward movement of said piston into said cylinder when said openable object is moved from an open position to a closed position and for biasing said piston outwardly from said cylinder so as to cause said openable object to move from said closed position to said open position;

check valve type damping means disposed within said cylindrical hollow cavity portion of said piston for controlling the inward and outward movement of said piston relative to said cylinder, and therefore the closing and opening movement of said openable object; and releasable locking means mounted upon said piston and cylinder for retaining said piston at said inward position relative to said cylinder, and said openable object at said closed position, against the biasing force of said coil spring biasing means in response to inward movement of said piston and said openable object from said open position to an inward position beyond said closed position of said openable object, when said releasable locking means is engaged, and for permitting said piston to move outwardly relative to said cylinder, and said openable object to move to said open position, under the influence of said coil spring biasing means in response to inward movement of said piston and said openable object from said inward position of said piston relative to said cylinder and said closed position of said openable object to said inward position beyond said closed position of said openable object against said biasing force of said coil spring biasing means so as to disengage said releasable locking means, comprising a heart-shaped land area provided upon the outer surface portion of said piston, endless groove means defined within said outer surface portion of said piston and disposed about said heart-shaped land area of said piston, and a locking pin fixedly mounted upon said cylinder for disposition within said endless groove means of said piston and for cooperation with said heart-shaped land area so as to respectively permit relative movement of said piston with respect to said cylinder between said open and closed positions of said openable object, and to retain said piston at said inward position and said openable object at said closed position.

16. A piston-cylinder type damper as set forth in claim 15, wherein:
said check valve type damping means comprises a duckbill type check valve.

17. A piston-cylinder type damper as set forth in claim 15, further comprising:
a threaded bore defined within said end wall of said cylinder; and
an adjustment screw threadedly engaged within said threaded bore for controlling the admission of ambient air into said cylinder whereby the damping degree of said damping means is adjustable.

18. A damper as set forth in claim 15, wherein:
said piston has a shaft portion having the configuration of a cruciform.

19. A damper as set forth in claim 15, wherein:
said piston and cylinder are fabricated from a plastic material.

20. A damper as set forth in claim 15, wherein:
said locking pin has the configuration of an inverted-U with a longer leg thereof extending radially inwardly into said endless groove means.

* * * * *